United States Patent Office 3,167,959
Patented Feb. 2, 1965

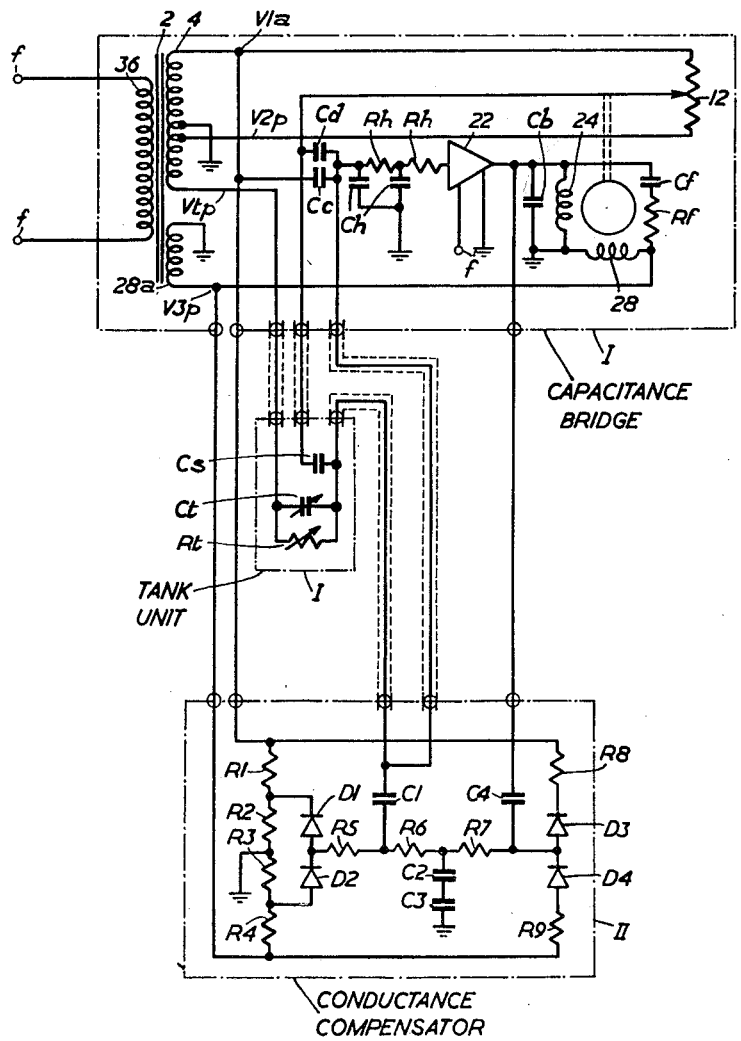

3,167,959
CAPACITIVE LIQUID LEVEL DEVICE WITH COMPENSATOR
Ivan Boris David Johnson, Guildford, Surrey, England, assignor to S. Smith & Sons (England) Limited
Filed Feb. 6, 1962, Ser. No. 171,525
10 Claims. (Cl. 73—304)

This invention relates to measuring apparatus and more particularly to liquid measuring apparatus of the capacitance bridge type.

Measuring apparatus of the latter type is commonly employed for fuel gauges in the aircraft industry and have in fact been particularly developed for such application.

However, there have been various proposals to introduce anti-static additives to aviation fuels to avoid the risk of explosion which may otherwise arise as a result of the increased fueling rates now associated with the new large transport aircraft. It will be appreciated that the use of such anti-static additives will be intended to render the fuel sufficiently conductive to prevent the accumulation of static electric charges to a dangerous level.

A direct result of conductive aviation fuels will be to introduce errors in the operation of existing capacitance bridge fuel gauges, and the problem of avoiding or taking account of such error has yet to be met.

One object of the present invention is to meet the latter problems in connection with capacitance bridge fuel gauges of a particular kind which may be defined as capacitance type liquid contents gauges of the kind including at least two capacitative impedance arms, the capacitance in a first one of said arms being variable in dependence upon the quantity of liquid to be measured, and each of said arms having first and second terminals of which the second terminals are connected together to a common point, means for deriving from a source of alternating voltage a first voltage of a given phase and predetermined magnitude for application across the first terminal of the first arm and a point of reference potential, means for deriving from the said alternating voltage source a second voltage of the opposite phase and variable magnitude for application across the first terminal of the second arm and said reference potential point, an amplifier having its input coupled across the common point and the reference potential point, means controlled by any component of the amplifier output derived from reactive input components, that is, input components which are in quadrature with the first voltage, for automatically adjusting the magnitude of the second voltage in the sense required to obtain a predetermined relationship between the first and second voltages, and actuating means for indicating the quantity of liquid to be measured in dependence upon the adjustment made.

The latter measuring apparatus will be referred to hereinafter as apparatus of the particular kind hereinbefore defined, and a particular example of such apparatus will be found in British specification No. 695,074 which describes the operation thereof in detail.

According to the present invention, in one aspect there is provided liquid measuring apparatus of the particular kind hereinbefore defined which further comprises means for deriving from said alternating source a resistive signal, that is, a signal either in phase with or of the opposite phase to the first voltage, means for feeding said resistive signal to the common point, means for detecting the magnitude of any components of the amplifier output which are derived from resistive input components and means for controlling the operation of the signal deriving means so that the resistive signal fed thereby to the common point substantially cancels any resistive component.

In general, a resistive component either in phase with or of opposite phase to the first voltage may appear at the common point and the signal deriving means will preferably be capable of producing a signal which can cancel such components of either phase, that is to say, be capable of producing a signal of appropriate magnitude and either in phase with or of opposite phase to the first voltage. However, in the large majority of circumstances, the resistive component arising from conductivity in the liquid will be in phase with the first voltage and it is therefore possible to compensate for this effect if the signal deriving means can only produce a signal of opposite phase to the first voltage.

In order that the present invention may be clearly understood the same will now be more fully described, by way of example, with reference to the single figure of the accompanying drawing which is a circuit diagram of one embodiment of capacitive liquid contents gauge in accordance with the invention.

The upper part I of the drawing comprises a capacitance bridge fuel gauge and tank unit arrangement which is, in general, of known form, the gauge being generally similar in construction and operation to that described in the above-mentioned specification. In view of the detailed description of construction and operation of this form of gauge in such specification it will be convenient to employ corresponding reference letters and numerals, where appropriate, and only to describe more fully those details which are additional in the present embodiment.

Thus part I of the drawing comprises an input transformer 2 having a primary winding 36 and a secondary winding 4, the latter winding having an intermediate tap connected to ground potential.

Rebalance potentiometer 12 is connected between the upper end and a further intermediate point of winding 4. The capacitor Ct which represents the capacitance of the tank unit, and will vary with the design thereof, is connected between the lower end of winding 4 and the input of a filter circuit Ch, Rh, the output of the latter circuit being applied directly to amplifier 22 as input.

The reference rebalance capacitor Cd and the reference fully-immersed capacitor Cs are connected in parallel between the tapping point of rebalance potentiometer 12 and the input of filter Ch, Rh; and the empty-balance capacitor Cc is connected between the upper end of secondary winding 4 and the input to filter Ch, Rh.

The output of amplifier 22 is applied to one end of a control winding 24 of motor 26 the other end of which is connected to ground, and a capacitor Cb is connected across control winding 24 to make the amplifier load substantially resistive.

The reference winding 28 of motor 26 is connected across a further secondary winding 28a of transformer 2, which winding 28a gives rise to an alternating voltage in phase with that applied to capacitor Ct.

A fail-safe circuit comprised by a series combination of resistor Cf and Rf is connected between the output of amplifier 22 and the "live" end of reference winding 28, to supply a small voltage to control winding 24, which voltage is in quadrature with that applied to capacitor Ct.

The small voltage supplied to the control winding 24 via the resistor Rf and capacitor Cf is in a sense to tend to cause the motor 26 to rotate its shaft back towards the position corresponding to zero content of the fuel tank. In normal circumstances this bias voltage, being opposed by the control voltage applied to the winding 24 from the amplifier 22, makes no substantial difference to the measure of fuel-content provided by the rotational position of the motor shaft. If, however, there is a break in supply of control voltage to the winding 24, for example as a result of a fault in the amplifier 22, the bias voltage ensures that the motor rotates back to the zero position. In this way a faulty condition can be readily detected, and the error in reading provided by the gauge is unlikely to prejudice safety.

The voltages V1a, V2p, Vtp and V3p denote the potentials at the upper, intermediate and lower ends of secondary winding 4, and the lower end of secondary winding 28a, the reference letters a and p in this context respectively denoting opposite phase and in-phase relative to Vtp, the potential applied to the tank unit capacitor Ct.

Generally, the operation of the latter gauge is such that any change in capacitance Ct will cause a current to flow into the amplifier 22 in quadrature with the supply voltages V1a, V2p, Vtp and V3p. The filter Ch, Rh, which will be seen to be of simple form, is designed to attenuate only noise and high harmonics, and the amplifier 22 has a low input impedance so that the phase shift of the latter quadrature current due to these components is negligible.

An amplified voltage, of opposite phase to the input current appears at the control winding 24 of the motor, and since this voltage will be in quadrature with that of the reference winding 28, rotation will occur, in such a sense as to adjust the variable tapping point of potentiometer 12 for rebalance of the bridge.

Considering the particular gauge arrangement as just described in relation to the earlier more general definition of the kind of apparatus with which the present invention is concerned, it will be seen that the capacitive bridge arms in question are those including capacitors Ct and Cs. Thus, Ct is variable in dependence upon the quantity of liquid to be measured and is connected between the junction of capacitors Ct and Cs as common point and the Vtp output from transformer 2 as source of alternating voltage. Similarly, Cs is connected between the same common point and the V1a output from transformer 2, which output is variable by way of potentiometer 12 adjustment.

The amplifier of the earlier definition is self-evident as amplifier 22, and the only point perhaps requiring comment in this respect is that the reference potential point is the ground point to which control winding 24 is connected. Finally, the control means in question comprises windings 24, 28, motor 26 and the adjustment linkage to the variable tap of potentiometer 12, this linkage also serving to actuate any suitable quantity indicator.

It might also be appropriate at this point to emphasize that the above particular embodiment is given by way of example only, and British specification No. 695,074 is simply referred to for convenience. Thus, while the particular embodiment is of a form commonly referred to as a "compensated bridge," that is, one for measuring the weight of liquid contents by assuming the specific gravity of the liquid to be linearly related to the dielectric constant of the liquid, the present invention may equally well be applied to other forms of bridge gauges, including "uncompensated bridge gauges" and this is in fact taken into account by the more general definition of the kind of apparatus in question.

In one example of a gauge embodiment as particularly described above, which example has been employed for development of the present invention, the various signal levels are such that:

(a) A change in fuel level of ±0.1% of maximum tank capacity causes a quadrature current of ±0.008 μa. to flow into the amplifier, producing a quadrature voltage of ±2 v., sufficient to start the motor.

(b) A quadrature input current of ±0.08 μa. will just saturate the amplifier causing it to limit its output at a quadrature voltage of about ±20 volts R.M.S.

(c) The sudden application of full tank capacitance when the gauge indicator reads empty, or of empty tank capacitance when the indicator reads full, causes a quadrature current of ±8 μa. to flow into the amplifier, which more than saturates the amplifier.

Since the present invention is concerned with conductance in liquids, conductance of the fuel in the embodiment being described is represented by a variable resistor Rt connected across capacitor Ct in the tank unit.

Before describing the conductance compensator of the present embodiment, it will be useful to consider the effects on the latter gauge of conductance in the fuel.

If the bridge is already balanced with respect to capacitance, the presence of resistor Rt will cause a resistive current to flow into amplifier 22 in phase with Vtp, and the resultant resistive output voltage component will be of opposite phase to Vtp. Since this resistive output contains no component in quadrature with Vtp the motor will receive no driving torque, and thus no error will result providing that the current due to Rt is insufficient to saturate the amplifier. Above the saturation signal level however, the amplifier becomes less sensitive to quadrature signals, and dead-zone errors increase in proportion to the amount of resistive input current. Furthermore the amount of bridge unbalance necessary to oppose the fail-safe current also increases, giving rise to negative errors superimposed on the increased dead-zone.

In the above particular gauge example, without conductance compensation a conductivity of 300 picomho/metre will give rise to an in-phase resistive current of 0.1 μa. in the tank unit system; this, being opposed by an in-phase resistive current of 0.025 μa. in the reference capacitor Cs, just falls short of saturation level. A conductivity of 6000 picomho/metre, however, will give rise to a resultant in-phase current of 2 μa., which is 25 times that necessary to saturate the amplifier. This will increase the dead-zone error to ±2.5% of full-scale indicator deflection and superimpose on it a negative error of 5% due to fail-safe current opposition. Moreover, the time taken for the indicator pointer to become stationary, after being disturbed, is much prolonged.

Coming now to the lower part II of the drawing, this comprises a circuit diagram of one embodiment of a conductance compensator in accordance with the invention and for use with the gauge just described.

This compensator circuit comprises a chain of resistors R1, R2, R3, R4 and a series combination of resistor R8, rectifiers D3, D4 and resistor R9, which chain and combination are connected in parallel across the upper end of secondary winding 4 and the lower end of secondary winding 28a, as shown. The centre junction of the latter resistor chain is connected to ground, and two rectifiers D1, D2 are connected in series between the outer junctions of such chain.

Resistors R5, R6, R7 are connected in series between the junctions of rectifiers D1, D2 and D3, D4, the latter junction also being connected, via capacitor C4, to the output of amplifier 22. Finally the junction of resistors R5, R6 is connected to the input of filter Ch, Rh via a blocking capacitor C1, and that of resistors R6, R7 is connected to ground via back-to-back electrolytic smoothing capacitors C2, C3.

In more general terms relative to the above gauge embodiment the conductance compensator of the present invention comprises a phase sensitive rectifier providing a direct current output signal, derived in response to resistive output components from the amplifier, to control a source of variable alternating resistive current in such manner as to substantially cancel resistive signal components arising from fuel conductance.

For a clearer understanding of the above conductance compensator embodiment its operation will be described relative to particular component values appropriate to the particular example of gauge driven above. These compensator components values are as follows:

R1 _____ 5.6MΩ
R2 _____ 5.6KΩ
R3 _____ 5.6KΩ

| | |
|---|---|
| R4 | 10MΩ |
| R5 | 5.6KΩ |
| R6 | 56KΩ |
| R7 | 100KΩ |
| R8 | 56KΩ |
| R9 | 100KΩ |
| C1 | 12 μf. |
| C2 | 60 μf. |
| C3 | 60 μf. |
| C4 | 0.03 μf. | while D1, D2 are small-signal silicon diodes; D3, D4 are silicon diodes 0.5 m.a., 120 P.I.V.; the supply to primary winding 36 is 115 v. at 400 c./s.; and potentials V1$a$, V2$p$, V3$p$ are 30 v., 1.4 v. and 54 v., respectively. The value of V$tp$ will vary with tank unit design.

Considering the case of a resistive current input to the amplifier in phase with V$tp$, this will give rise to an output voltage component from the amplifier which is in phase with V1$a$. Thus, when the latter goes through a negative half-cycle, rectifiers D3 and D4 are biased to conduct; at the same time the upper plate of C4 also goes negative, and a certain amount of positive charge is attracted to the lower plate via the rectifiers. During the following positive half-cycle of V1$a$ rectifiers D3, D4 are cut off, and the positive charge flows from the lower plate of C4, via resistor R7, to be stored in smoothing capacitors C2, C3.

In the case of a resistive current input of opposite phase to V$tp$, a similar operation causes a negative charge to accumulate in capacitors C2, C3.

If the amplifier output is entirely in quadrature with V$tp$, as is the case with no fuel conductance, no net charge flows through resistor R7 since D3, D4 are conductive during equal portions of the positive and negative half cycles relative to V1$a$ and V$tp$.

Regarding the variable alternating current source to be controlled, this is comprised by resistor chain R1–R4 and rectifiers D1, D2. The resistor chain in fact provides two sources of alternating potential, namely the junctions of resistors R1, R2 and R3, R4, which potentials are of mutually opposite phase and each of 30 mv., the voltages being maintained at this low level to minimize the non-linear distortion which occurs when D1, D2 conduct. This level is also well below the barrier level of the silicon diodes employed for D1, D2, so that when these are not biased no appreciable alternating current flows.

Rectifiers D1, D2 are employed as variable resistors the dynamic resistance of which, over a range of 30 mv. A.C. is controlled by the forward bias current which flows through resistors R6 and R5. There would appear to be no special characteristic required for D1, D2, other than a low saturation current at small reverse voltages. When forward biased with currents in the range 0–10 μa. their dynamic resistance to small signals is inversely proportional to the forward bias current, and at room temperatures can be expressed as $r=0.04/I$ where $r$ is dynamic resistance (ohms) and $I$ is forward bias current (amperes).

For small alternating voltages therefore, D1, D2 have conductance which is variable from substantially zero at zero bias currenet up to about 250 μmhos at 10 μa. bias current. For a constant signal voltage, therefore, the signal current is proportional to the bias current: for example, with 30 mv. signal the R.M.S. signal current will be numerically equal to three-quarters of the bias current.

For higher values of bias current this relation no longer holds, since the rectifier resistance becomes comparable with the source resistances R2, R3 and the series resistance R5. However, this is not disadvantageous, since it limits the amount of non-linear distortion present at the higher signals levels, and prevents the amplifier input impedance from being shunted with consequent loss of sensitivity.

Considering then the overall compensator operation: under quiescent conditions, when no bias current flows, D3, D4 have high resistance and no signal current flows via the blocking capacitor C1.

If there is a positive charge on C2, C3, then D1 conducts and allows a controlled amount of signal current to flow into the amplifier input in opposition to that arising from R$t$ and which was originally responsible for initiating the positive bias at C2. Most of the fundamental resistive current component is thus eliminated from the amplifier input, leaving a small even-harmonic mixture due to non-linear distortion. In any event, even under the worst conditions, the total residual output from the amplifier does not exceed 8 v. which is well within its saturation limit.

If, as a result of a resistive current of opposite phase, a negative charge appears on C2, C3, then D2 conducts to provide an appropriate signal current in opposition to the resistive current. The complete compensator circuit described by way of example is therefore symmetrical, and although it is extremely unlikely that resistive currents of opposite phase will be encountered in normal circumstances, such currents may be taken into account by the provision of only four of the illustrated compensator circuit components.

Also, although the invention has been described with particular reference to fuel gauge conductance compensation, in another aspect it provides an impovred electrical circuit arrangement comprising a phase sensitive rectifier for producing a direct current signal output to control a source of variable alternating current voltage, such as described above by way of example.

I claim:

1. A liquid contents gauge comprising two electric signal paths both of which have capacitive reactance, the capacitive reactance of a first of the two paths being variable in dependence upon the quantity of liquid to be measured, means for supplying a first alternating current signal to an input end of said first signal path, means for applying to an input end of the second signal path a second alternating current signal of opposite phase to said first signal and having an amplitude which is selectively variable relative to the amplitude of said first signal, signal combining means responsive to signals appearing at output ends of the first and second paths to derive therefrom a control signal having an amplitude dependent upon the relative amplitudes of the signals at the output ends, control means which is responsive to difference from a predetermined value in the amplitude of the control signal derived by said signal combining means to vary the amplitude of said second signal in a sense tending to reduce said difference to zero, means for detecting in the control signal as this is applied to said control means any signal component which is in phase with one of said first and second signals, and means responsive to any component detected as aforesaid to inject into said control signal before it is applied to said control means a signal to tend to cancel the detected in-phase component.

2. A liquid contents gauge comprising: first and second capacitive impedance arms each having first and second terminals at opposite ends thereof, the capacitance in said first arm being variable in dependence upon the quantity of liquid to be measured; electric supply means connected to the first terminals of the two arms for supplying to the two arms respectively first and second alternating current signals which are of opposite phase to one another, the supply means including means which is selectively adjustable for varying the amplitude of the signal supplied to said second arm with respect to the amplitude of the signal supplied to said first arm; a point electrically common to the second terminals of both arms; an amplifier coupled to the common point for providing an output electric control signal having first and second components that are respectively dependent upon any reactive signal component and any resistive signal component appearing at said common point, said resistive and reactive components being signal components that are respectively in phase and in phase quadrature with one of said first and second signals; detector means responsive to any said second component of said control signal to derive alternating voltage having an amplitude dependent upon the amplitude of the detected second component; means for applying the derived alternating voltage to said common point substantially to cancel the resistive component and thereby substantially to cancel from the control signal any said second component; and means responsive to the control signal to adjust the adjustable means of said supply means in a sense to tend to reduce the control signal to zero.

3. A liquid contents gauge comprising: first and second capacitive impedance arms each having first and second terminals at opposite ends thereof, the capacitance in said first arm being variable in dependence upon the quantity of liquid to be measured; electric supply means connected to the first terminals of the two arms for supplying to the two arms respectively first and second alternating current signals which are of opposite phase to one another, the supply means including means which is selectively adjustable for varying the amplitude of the signal supplied to said second arm with respect to the amplitude of the signal supplied to said first arm; a point electrically common to the second terminals of both arms; an amplifier coupled to the common point for providing an electric control signal having first and second components that are respectively dependent upon any reactive signal component and any resistive signal component appearing at said common point; said resistive component being a signal component in phase quadrature with said reactive component which latter component is itself in phase quadrature with each of said first and second signals; detector means responsive to any said second component of said control signal to detect the existence of any resistive component at said common point; means to derive an alternating current signal of opposite phase to, and having an amplitude dependent upon, the resistive component detected as aforesaid; means for applying the derived signal to said common point substantially to cancel the resistive component and thereby substantially to cancel from the control signal any said second component; and means responsive to the control signal to adjust the adjustable means of said supply means in a sense to tend to reduce the control signal to zero.

4. Apparatus according to claim 2 wherein said detecting means comprises a phase sensitive rectifier for generating a direct current output representing the magnitude of the detected amplifier output components.

5. Apparatus according to claim 4 wherein said phase sensitive rectifier comprises means for deriving a third alternating current signal of predetermined magnitude and of a given phase, means for deriving a fourth alternating current signal of predetermined magnitude and of the opposite phase, first and second unidirectionally conductive devices connected in the same sense and in series between said third and fourth alternating current signal deriving means, means for applying the amplifier output to the junction of said devices, and capacitative storage means connected to said junction.

6. Apparatus according to claim 5 comprising means for deriving a fifth alternating current signal of predetermined magnitude and of opposite phase to said given phase, a third unidirectionally conductive device connected between said fifth voltage deriving means and the junction of said first and second devices, in the same sense as the device connected between said junction and said fourth current signal deriving means, whereby the conductance of said third device is controlled by accumulated charge of predetermined polarity in said storage means.

7. Apparatus according to claim 6 comprising means for deriving a sixth alternating current signal of predetermined magnitude and of said given phase, a fourth unidirectionally conductive device connected between said sixth current signal deriving means and the junction of said first and second devices in the same sense as the device connected between said junction and said third current signal deriving means, whereby the conductance of said fourth device is controlled by accumulated charge in said storage means of opposite polarity to said predetermined polarity.

8. Apparatus according to claim 7 wherein said first and second devices are similar silicon diodes, and said third and fourth signals are of equal magnitude; and said third and fourth devices are similar silicon diodes, and said fifth and sixth signals are of equal magnitude.

9. Liquid contents measuring apparatus of the kind including at least two capacitative impedance arms, the capacitance in a first one of said arms being variable in dependence upon the quantity of liquid to be measured, the capacitance in a second one of said arms being fixed relative to the liquid to be measured, and each of said arms having first and second terminals of which the second terminals are connected together to provide a point electrically common to both, means for deriving a first alternating voltage of a given phase and predetermined magnitude for application across the first terminal of the first arm and a point of reference potential, means for deriving a second alternating voltage of opposite phase to and of variable magnitude with respect to said first voltage for application across the first terminal of the second arm and said reference potential point, means responsive to any signal appearing at said common point for automatically adjusting the magnitude of the second voltage in the sense required to obtain a predetermined relationship between the first and second voltages, and actuating means for indicating the quantity of liquid to be measured in dependence upon the adjustment made, which apparatus further comprises detector means for detecting the existence at said common point of any signal component in phase with one of said first and second voltages, means for deriving at least one alternating current signal of amplitude dependent upon any component detected as aforesaid and of opposite phase thereto, and means for applying the derived signal to said common point substantially to cancel the detected component.

10. A liquid level gauge particularly adapted for measurement of the level of fuels which are electrically conductive comprising, two electrical signal paths each having substantially only capacitive reactance, the capacitive reactance of only one of said signal paths being variable in dependence upon the quantity of the liquid to be measured, means for applying to said two signal paths respectively alternating-current signals having predetermined phase relationships relative to each other, means responsive to the signal component in each of said two signal paths which is in phase quadrature with the alternating-current signal applied to the respective signal path for producing a control signal representative of liquid level, and means responsive to the signal components in said two signal paths which are respectively in phase with the alternating-current signal applied to the corresponding signal path for injecting a signal in at least one of said paths having an amplitude and phase relationship relative to the alternating-current signal applied to said one path which tends to cancel any in-phase signal component appearing in said paths to thereby compensate for the effect of electrical conductance of said liquid.

References Cited by the Examiner
UNITED STATES PATENTS

| | | | |
|---|---|---|---|
| 2,767,360 | 10/56 | Storm | 73—304 |
| 2,769,338 | 11/56 | Hermanson | 73—304 |
| 3,037,385 | 6/62 | Franzel et al. | 73—304 |

ISAAC LISANN, *Primary Examiner.*